United States Patent
Subramanian et al.

(10) Patent No.: US 10,853,308 B1
(45) Date of Patent: Dec. 1, 2020

(54) METHOD AND APPARATUS FOR DIRECT MEMORY ACCESS TRANSFERS

(71) Applicant: Xilinx, Inc., San Jose, CA (US)

(72) Inventors: Ramesh R. Subramanian, Hyderabad (IN); Ravinder Sharma, Hyderabad (IN); Jayaram Pvss, Hyderabad (IN); Michael Zapke, Munich (DE); Manjunath Chepuri, Secundrabad (IN)

(73) Assignee: Xilinx, Inc., San Jose, CA (US)

( * ) Notice: Subject to any disclaimer, the term of this patent is extended or adjusted under 35 U.S.C. 154(b) by 22 days.

(21) Appl. No.: 16/195,218

(22) Filed: Nov. 19, 2018

(51) Int. Cl.
*G06F 15/167* (2006.01)
*G06F 15/173* (2006.01)
*G06F 13/28* (2006.01)

(52) U.S. Cl.
CPC ........ *G06F 15/17331* (2013.01); *G06F 13/28* (2013.01)

(58) Field of Classification Search
CPC ........... H04N 21/2387; H04N 21/6587; H04N 21/23106
See application file for complete search history.

(56) References Cited

U.S. PATENT DOCUMENTS

| | | | |
|---|---|---|---|
| 9,916,129 B1 | 3/2018 | Ahmad et al. | |
| 2006/0161696 A1* | 7/2006 | Anjo | G06F 15/7867 710/22 |
| 2010/0195974 A1* | 8/2010 | Zheng | H04N 21/23106 386/343 |
| 2014/0095884 A1* | 4/2014 | Kannavara | G06F 21/32 713/186 |
| 2014/0173127 A1* | 6/2014 | Samuels | H04L 41/082 709/234 |

* cited by examiner

*Primary Examiner* — Yves Dalencourt
(74) *Attorney, Agent, or Firm* — Haynes and Boone, LLP (57) ABSTRACT

A circuit for memory access includes a memory access control circuit. The memory access controller is coupled to a memory and configured to perform data transfers to retrieve data from the memory. The memory access control circuit includes a timing control circuit and a transfer control circuit. The timing control circuit is configured to determine first timing information based on a timing requirement for transmitting a first data stream to a first network; and determine a first fetch time for retrieving the first data stream from the memory based on the first timing information. The transfer control circuit is configured to retrieve the first data stream from the memory based on the first fetch time.

20 Claims, 8 Drawing Sheets

| | Stream ID 410 | Out Q 412 | Fetch Type 414 | Number of Frames 416 | Time Slot 418 | Stop? 420 |
|---|---|---|---|---|---|---|
| 402 for scheduled stream A | 2 | Scheduled | Discrete | 1 | 10μs - PTP offset | Start |
| 404 for scheduled stream B | 3 | Scheduled | Discrete | 1 | 20μs - PTP offset | Start |
| 406 for reserved stream C | 1 | Reserved | Continuous | N/A | 9ms - PTP offset | Stop |
| 408 for best effort stream D | 0 | Best Effort | Continuous | N/A | 10ms - PTP offset | Stop |

| Scheduled Gate 602 | Reserved Gate 604 | Best Effort Gate 606 | Time Period in a Cycle 608 |
|---|---|---|---|
| Open | Close | Close | 0-32μs |
| Close | Open | Close | 32μs-9ms |
| Close | Close | Open | 9ms-10ms |

METHOD AND APPARATUS FOR DIRECT MEMORY ACCESS TRANSFERS

FIELD

Examples of the present disclosure generally relate to integrated circuits (ICs) and, in particular, to an embodiment related to systems and methods for direct memory access transfers using an IC.

BACKGROUND

Direct memory access (DMA) is a method that may transfer data from one location to another location without the intervention of a device that initiates the data transfer. DMA transfers of data may be performed by a DMA controller, which includes specialized hardware for conducting the DMA transfers quickly and efficiently. This allows for large data transfers to be conducted without imposing a significant burden on the device that initiated the data transfer. DMA transfers may be used for data transfers between various devices, e.g., input/output devices, and memory-to-memory data transfers.

In a communication system, DMA may be used by applications to transfer data between applications and a network. Many applications using the communication system, such as process control applications and machine control applications may have a large number of streams. Moreover, these applications may be time sensitive (e.g., latency critical to meeting control loop frequency requirements) and have time sensitive streams. However, a typical DMA system may not guarantee the time precision required by those time sensitive applications.

Accordingly, it would be desirable and useful to provide an improved way for DMA transfers.

SUMMARY

In some embodiments in accordance with the present disclosure, a circuit for memory access includes a memory access control circuit coupled to a memory and configured to perform data transfers to retrieve data from the memory. The memory access control circuit includes a timing control circuit and a transfer control circuit. The timing control circuit is configured to: determine first timing information based on a timing requirement for transmitting a first data stream to a first network; and determine a first fetch time for retrieving the first data stream from the memory based on the first timing information. The transfer control circuit is configured to: retrieve the first data stream from the memory based on the first fetch time.

In some embodiments, the first timing information includes a stream parameter selected from the group consisting of a stream identifier, a stream priority, and a stream fetch type.

In some embodiments, the memory access control circuit further comprises: an output control circuit configured to provide the first data stream to an end station coupled to the first network. The first timing information includes end station timing information from the end station. The timing requirement includes a first timing requirement associated with transmitting the first data stream by the end station to the first network.

In some embodiments, the end station timing information includes: data buffer occupancy information associated with a plurality of data buffers of the end station configured to receive streams of corresponding stream priorities respectively.

In some embodiments, the end station timing information includes: scheduler information associated with a scheduler of the end station. The scheduler includes a plurality of data transmission gates configured to control data transmission from the plurality of data buffers and the first network. The first timing requirement is associated with transmitting the first data stream at a first data transmission gate.

In some embodiments, the scheduler information includes a scheduler cycle time of the scheduler or gate transmission times of the data transmission gates. The plurality of data transmission gates are configured to control data transmission based on the scheduler cycle time or gate transmission times.

In some embodiments, the timing control circuit is configured to: determine second timing information based on a second timing requirement for transmitting a second data stream to the first network; and determine a second fetch time for retrieving the second data stream from the memory based on the second timing information. The transfer control circuit is configured to retrieve the second data stream from the memory based on the second fetch time.

In some embodiments, the first data stream and second data stream have a same stream priority. The first timing requirement is associated with a first allocated gate transmission time associated with the first data transmission gate. The second timing requirement is associated with a second allocated gate transmission time associated with the first data transmission gate.

In some embodiments, the first data stream and second data stream have different stream priorities. The second timing requirement is associated with transmitting the second data stream at a second data transmission gate.

In some embodiments, the circuit includes a user input configured to receive a frame fetch latency of the timing information associated with fetching a frame from the memory. The first fetch time is determined based on the frame fetch latency.

In some embodiments, a method for memory access includes determining a first timing information based on a timing requirement for transmitting a first data stream to a first network; determining a first fetch time for retrieving the first data stream from a memory based on the first timing information; and retrieving the first data stream from the memory based on the first fetch time.

In some embodiments, the first timing information includes a stream parameter selected from the group consisting of a stream identifier, a stream priority, and a stream fetch type.

In some embodiments, the stream priority is selected from the group consisting of a scheduled priority, a reserved priority, and a best-effort priority. The scheduled priority is higher than the reserved priority, and the reserved priority is higher than the best-effort priority.

In some embodiments, the stream fetch type is one of a continuous fetch type and a discrete fetch type.

In some embodiments, the method includes providing, to an end station coupled to a first network, the retrieved first data stream. The first timing information includes end station timing information from the end station.

In some embodiments, the end station timing information includes: data buffer occupancy information associated with a plurality of data buffers of the end station configured to receive streams of corresponding stream priorities respectively.

In some embodiments, the end station timing information includes: scheduler information associated with a scheduler of the end station. The scheduler includes a plurality of data transmission gates configured to control data transmission from the plurality of data buffers to the first network. The timing requirement is associated with transmitting the first data stream at a first data transmission gate.

In some embodiments, the scheduler information includes a scheduler cycle time of the scheduler or gate transmission times of the data transmission gates. The plurality of data transmission gates are configured to control data transmission based on the scheduler cycle time or gate transmission times.

In some embodiments, the method includes receiving, through a user input, a frame fetch latency of the timing information. The first fetch time is determined based on the frame fetch latency.

In some embodiments, the first data stream is retrieved from the memory by performing a direct memory access (DMA) transfer.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. For real time communication of time sensitive streams (e.g., in industrial control applications, digital video and audio data) over the networks, network devices (e.g., switches, routers, bridges, etc.) implement low latency, non-blocking, and highly deterministic frame forwarding mechanisms. To enable deterministic real-time communication over Ethernet, Time-Sensitive Networking (TSN) standards have been defined by the IEEE TSN task group. By using time synchronization, a schedule shared between network devices, and queues defined based on time, TSN provides a bounded maximum latency for scheduled traffic through switched networks. Time sensitive stream sources (e.g., TSN talkers) need to ensure that high priority time sensitive traffics are forwarded with time precision in the presence of best-effort (low priority) traffics. Time aware schedulers as defined by IEEE 802.1Qbv differentiate traffics across different priority queues, and do not need to apply to different time sensitive streams within the same priority queue. Typically, TSN end stations and network elements (e.g., switches/bridges) implement buffering and DMA functions based on the corresponding priority (e.g., scheduled, reserved, best effort), and the DMA functions (e.g., fetching time sensitive data from the memory) are typically are not time aware. Since all of the TSN streams are classified as same priority traffic with a scheduled priority, those TSN streams are queued in the same FIFO buffer in the TSN end station and TSN network. This causes inter-stream interference, where a TSN stream is susceptible to interference from another TSN stream with the same priority both at source as well as in the network. In some examples, a misbehaving high priority TSN stream may interfere and delay another well behaved high priority TSN stream at the source. In other examples, a misbehaving high priority TSN stream may interfere and push out another well behaved high priority TSN stream at the source. Because time sensitivity at the application level due to processor load may result in jitters that increases loss of timing precision and stream-interference, the number of time sensitive applications supported in a processor may be limited.

For integrated circuit (IC) solutions, it has been discovered that by using a multi-channel time aware DMA (TADMA) method, a more complete deterministic TSN system from data source (e.g., a talker device) to destination (e.g., a listener/consumer device) may be realized with reduced stream interference. Various advantages may be present in various applications of the present disclosure. No particular advantage is required for all embodiments, and different embodiments may offer different advantages. One of the advantages of some embodiments is that by using TADMA, greater scalability for the number of time sensitive applications supported by a processor is provided. Another of the advantages of some embodiments is that by using TADMA, multiple time sensitive streams originated from the same talker end station have guaranteed QoS with reduced/eliminated inter-stream interference. In other words, a misbehaving stream does not delay a well-behaved stream originated from the same talker. This creates a per stream time aware scheduling mechanism in the talker systems, and enables the TSN system to have time sensitive traffic flows with reduced inter-stream interference.

Because one or more of the above-described embodiments are exemplified using a particular type of IC, a detailed description of such an IC is provided below. However, other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
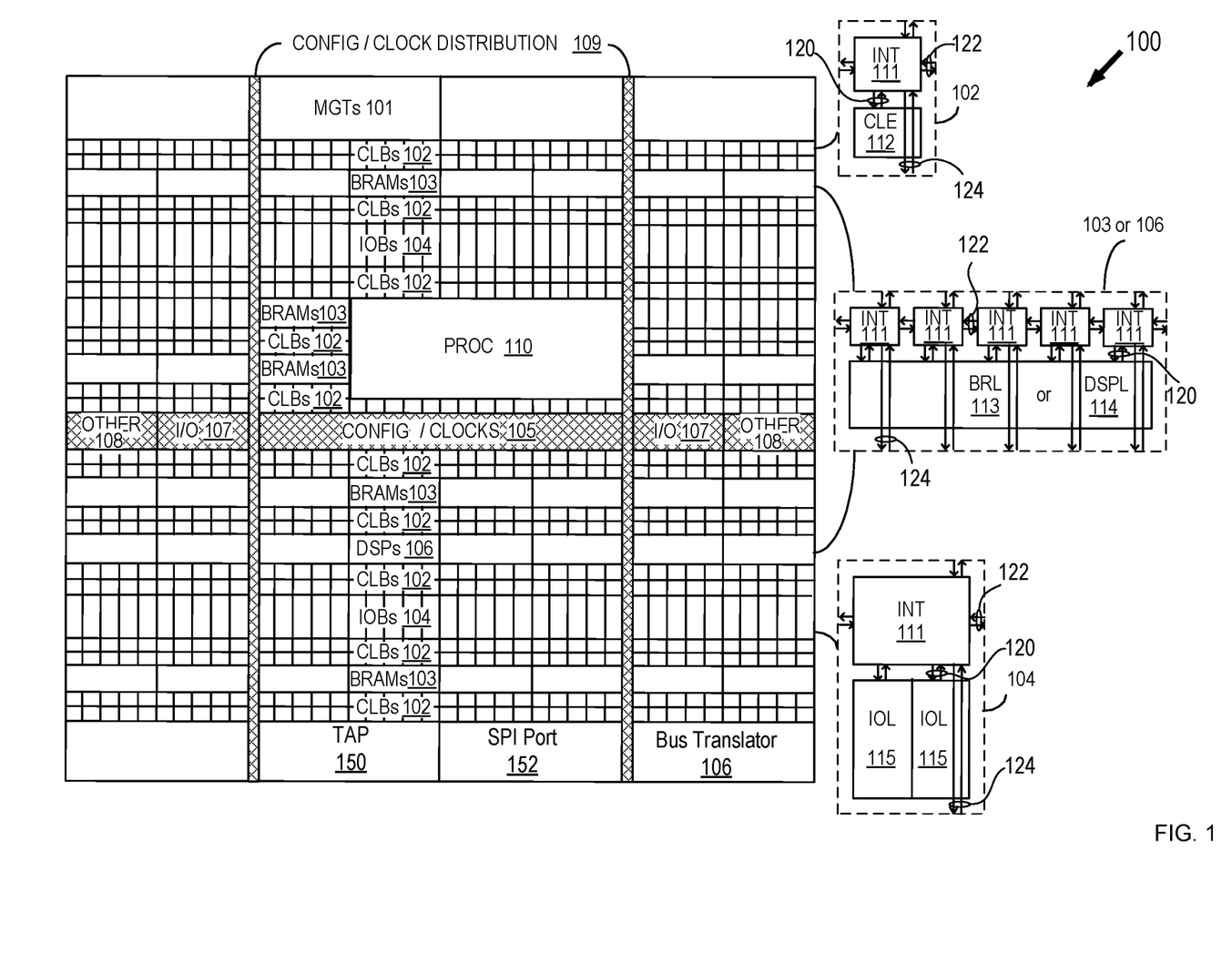
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

Figure 2:
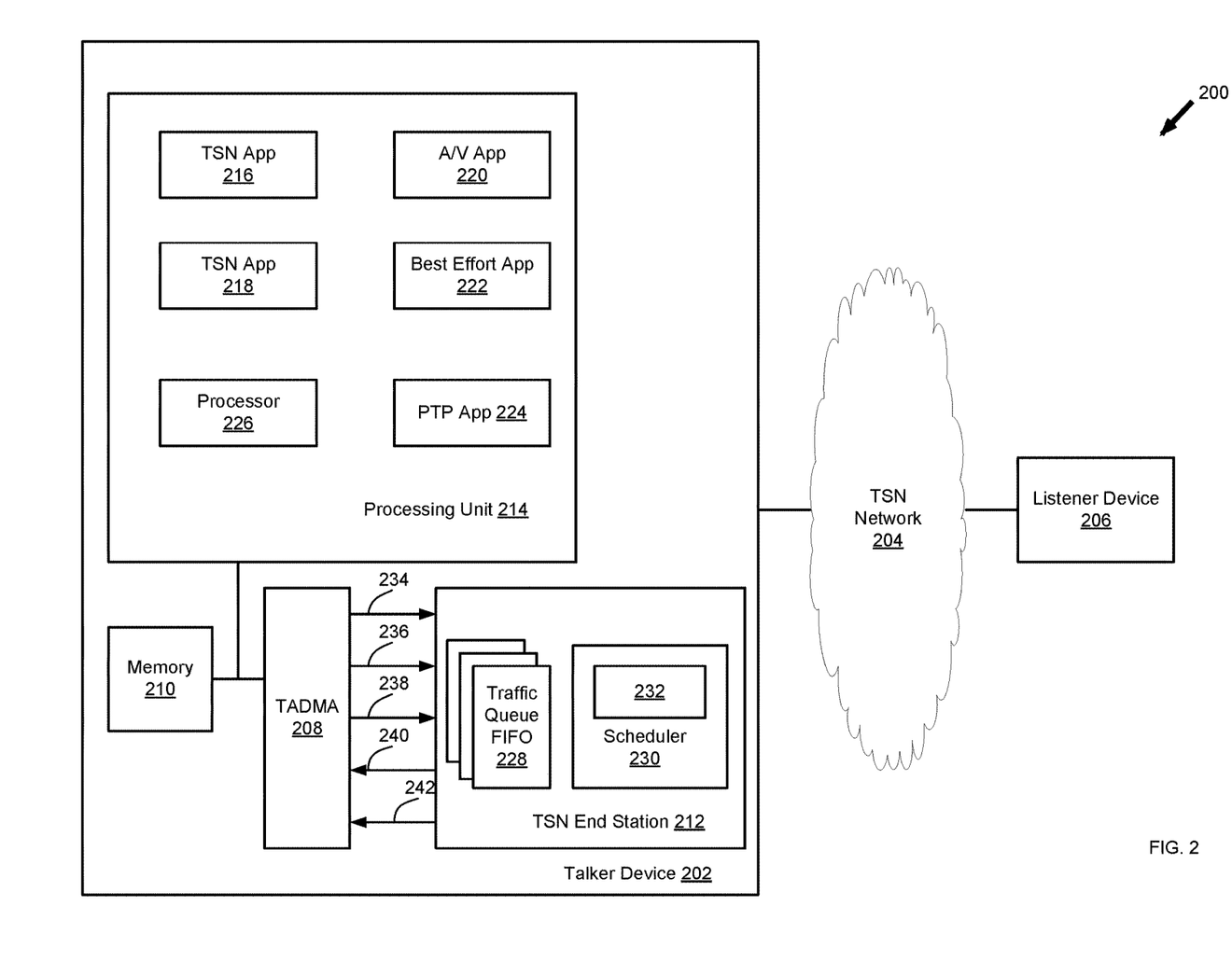
FIG. 2 is a block diagram illustrating an exemplary communication system according to some embodiments of the present disclosure.

Referring to the example of FIG. 2, illustrated is a time sensitive network (TSN) system 200 using TADMA. The TSN system 200 includes a talker device 202 communicating with a listener device 206 through a TSN network 204. The talker device 202 includes a TADMA circuit 208. The TADMA circuit 208 is connected to (e.g., through a data bus) a processing unit 214, a memory 210, and a TSN end station 212. The TADMA circuit 208 may receive stream information (e.g., stream identifiers), timing information associated with the stream (e.g., scheduler cycles, stream time slots, etc.) from the processing unit 214, and fetch from the memory 210 the corresponding stream. By using the stream information and timing information, the TADMA may perform DMA transfers at precisely required times to provide high time precision for TSN streams.

As shown in FIG. 2, the processing unit 214 includes a processor 226 supporting various applications including time sensitive applications 216 and 218 with a scheduled class traffic, an audio/video application 220 with a reserved class traffic having a lower priority than the scheduled class traffic, and a best effort application 222 with a best effort class traffic having a lower priority than the reserved class traffic. The processing unit 214 also includes a Precision Time Protocol (PTP) application 224 for providing a synchronization clock signal for the applications 216, 218, 220, 222 and the TADMA circuit 208.

The TADMA circuit 208 provides DMA streaming for both time sensitive applications (e.g., time sensitive applications 216 and 218 having traffics highly critical for the operation of the system with isochronous, cyclic, or alarms and events traffic) and non-time-sensitive applications (e.g., diagnostic application, audio/video application 220 and best effort application 222). The TADMA circuit 208 may send streams 234, 236, and 238 to the TSN end station 212. Together with the TSN end station 212 (e.g., including a scheduler 230 and per-traffic-class FIFOs 228), the TADMA circuit 208 may provide TSN streams of a scheduled priority without inter-stream interference to the network, along with streams with lower priorities (e.g., a reserved priority, a best effort priority). As described in detail below, the TADMA circuit 208 receives timing information about the DMA transfer, including for example, stream parameters associated with a corresponding stream, FIFO occupancy information 240 from the FIFOs 228, scheduler information 242 (e.g., scheduler cycle time, gate control information including gate transmission times (e.g., open times, close times) of its gates) from the scheduler 230, other suitable timing information, and/or a combination thereof. The scheduler 230 of the TSN end station 212 may include a memory 232 for storing the gate control information.

Figure 3:
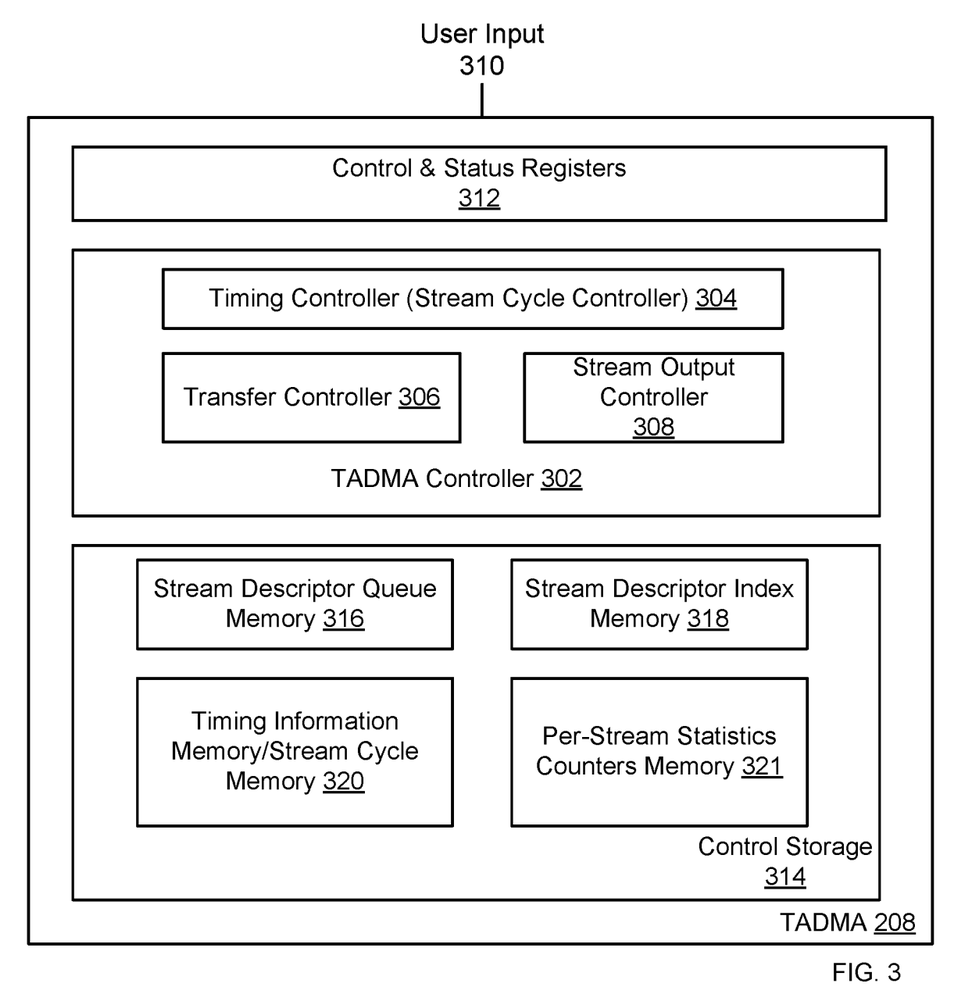
FIG. 3 is a block diagram illustrating an exemplary time aware DMA (TADMA) circuit according to some embodiments of the present disclosure.

Referring to the example of FIG. 3, illustrated is a TADMA circuit 208 configured to perform TADMA data transfers between various portions (e.g., processing unit 214, memory 210, TSN end station 212) of a system (e.g., talker device 202) over a data bus.

The TADMA circuit 208 includes a TADMA controller 302 (including e.g., a core TADMA engine or a TADMA processor) managing data transfers indicated by DMA transfer requests. The DMA transfer requests may specify data transfers to be performed, for example, via one or more data channels of a data bus between the processing unit 214, the memory 210, or the TSN end station 212. The TADMA controller 302 may receive DMA transfer requests from, for example, the processing unit 214.

The TADMA controller 302 includes a timing control circuit 304 that determines timing information associated with streams to be retrieved from the memory 210, and controls the DMA transfers that retrieve the streams from the memory 210 according to the timing information. The timing information may include stream parameters, current PTP time and/or associated PTP offset, FIFO occupancy information 240 from the FIFOs 228, scheduler information 242 from the scheduler 230, any suitable timing information, and/or a combination thereof.

In various embodiments, the timing information may be configured by a user through user input 310, and stored in a control and status register 312. The timing control circuit 304 may receive timing information from the control and status register 312, and determine the timing for performing a DMA transfer request (e.g., a DMA fetch request) for a particular stream based on the corresponding timing information. For example, the user input 310 may include a frame fetch latency from a system memory 210 to a TSN end station 212 (e.g., to its medium access control (MAC) sublayer).

As shown in FIG. 3, the TADMA controller 302 may include a transfer control 306. The transfer control 306 may perform data transfers based on timing control information from the timing control 304, e.g., retrieving data of streams from the memory 210 based on the timing for associated DMA transfer requests. The retrieved stream data may be provided to a stream output control 308, which may provide the retrieved streams to corresponding data channels and/or queues of the TSN end station 212 (e.g., by using a multiplexer).

In some embodiments, the TADMA circuit 208 includes a control storage 314 (e.g., a data storage) coupled to the TADMA controller 302 and/or control and status registers 312. The control storage 314 may include memories for storing control information (e.g., timing information) used for TADMA data transfer. For example, the control storage 314 may include a stream circular descriptor queue memory 316 for storing frame descriptor queues for respective streams. The control storage 314 may include a stream descriptor index memory 318 storing frame descriptor indexes (e.g., producer index, consumer index). The control storage 314 may include a timing information memory 320 (also referred to as a stream cycle memory 320) for storing timing information associated with transmitting streams to a network, and a per-stream statistics counters memory 321 for storing counters for per-stream statistics.

In some embodiments, the TADMA circuit 208 includes an interconnect interface to connect to a memory mapped system memory 210 (including e.g., a double data rate synchronous dynamic random-access memory (DDR SDRM), BRAM, any other suitable memory, and/or a combination thereof) through the interconnect interface. In some examples, the interconnect interface may include an interface for providing configuration and status between the processing unit 214 and the TADMA circuit 208. In some examples, the TADMA circuit 208 supports a customizable number of streams with a customizable per stream buffer depth, and provides an option (e.g., through a user input 310) to increase a memory map data width to reduce the data path latency.

Figure 4A:
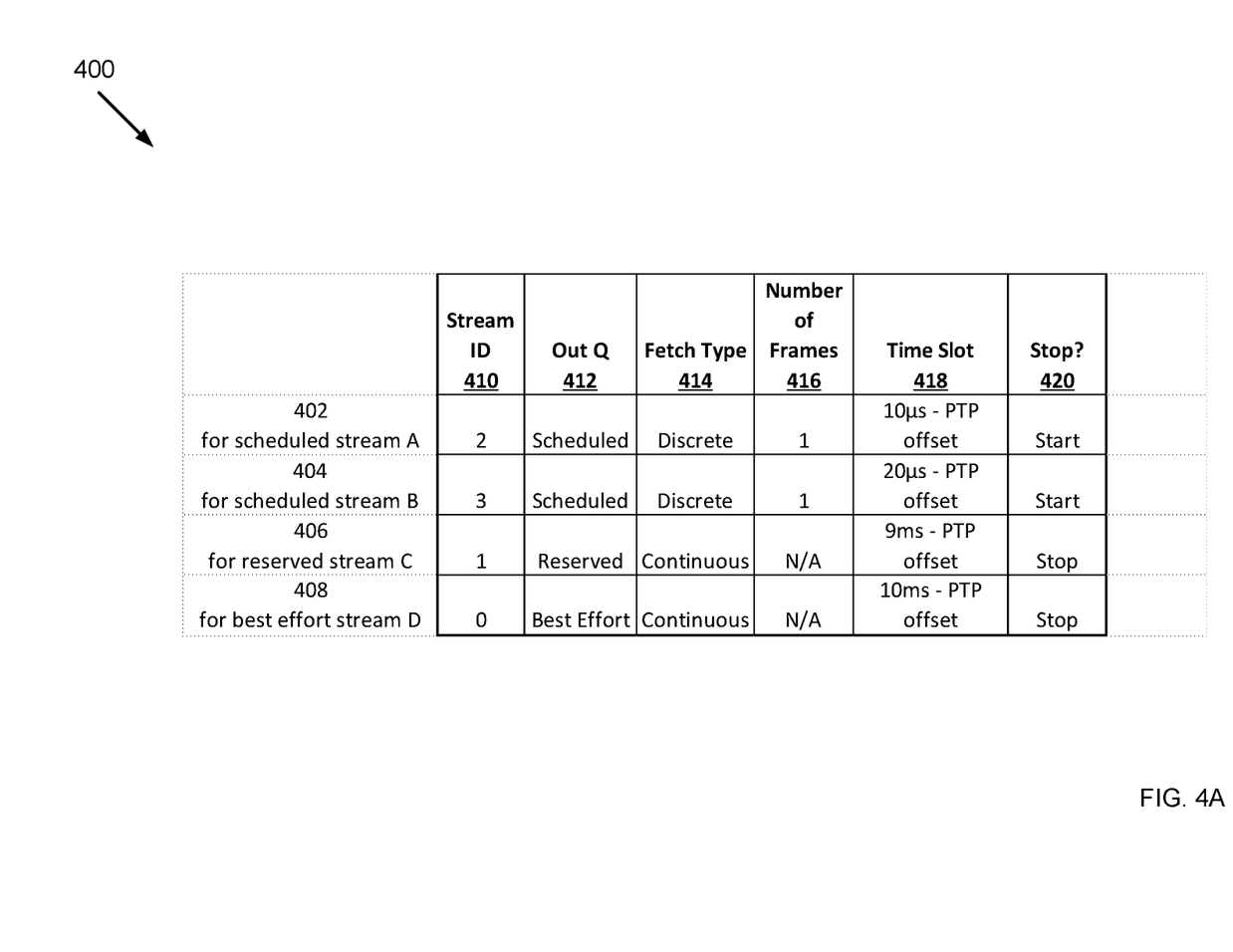
FIG. 4A is a table illustrating timing information (stream cycle memory configurations) for streams of a TADMA circuit according to some embodiments of the present disclosure.
Figure 4B:
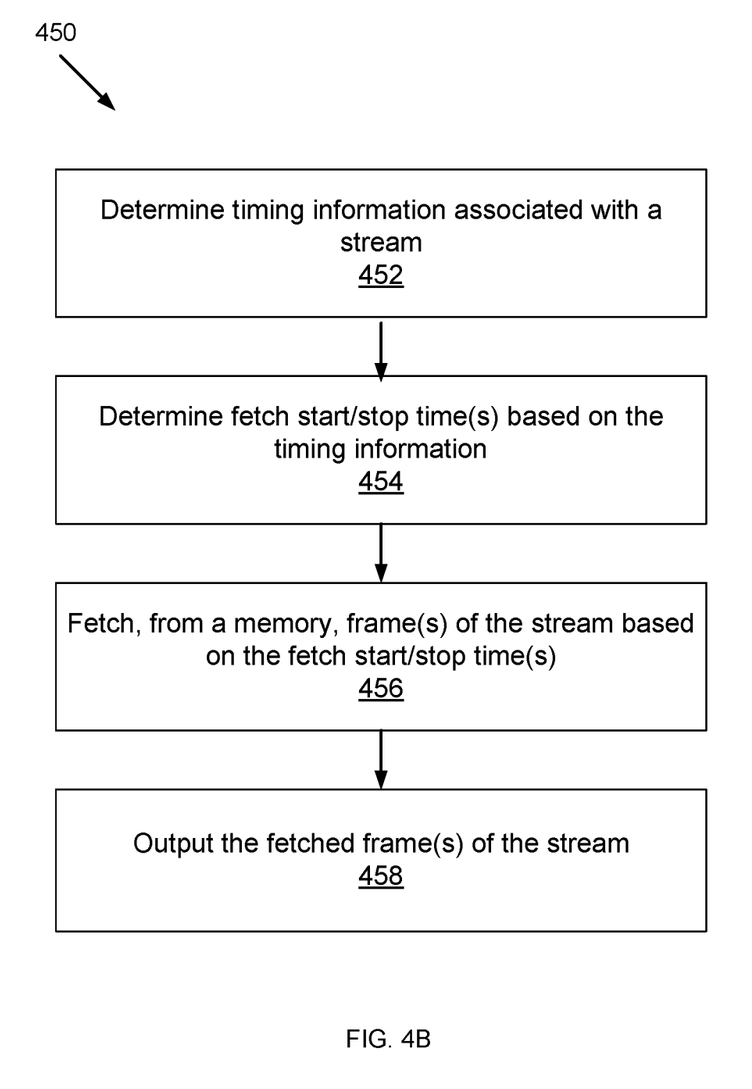
FIG. 4B is a flow chart illustrating a TADMA method based on the timing information according to some embodiments of the present disclosure.
Figure 5:
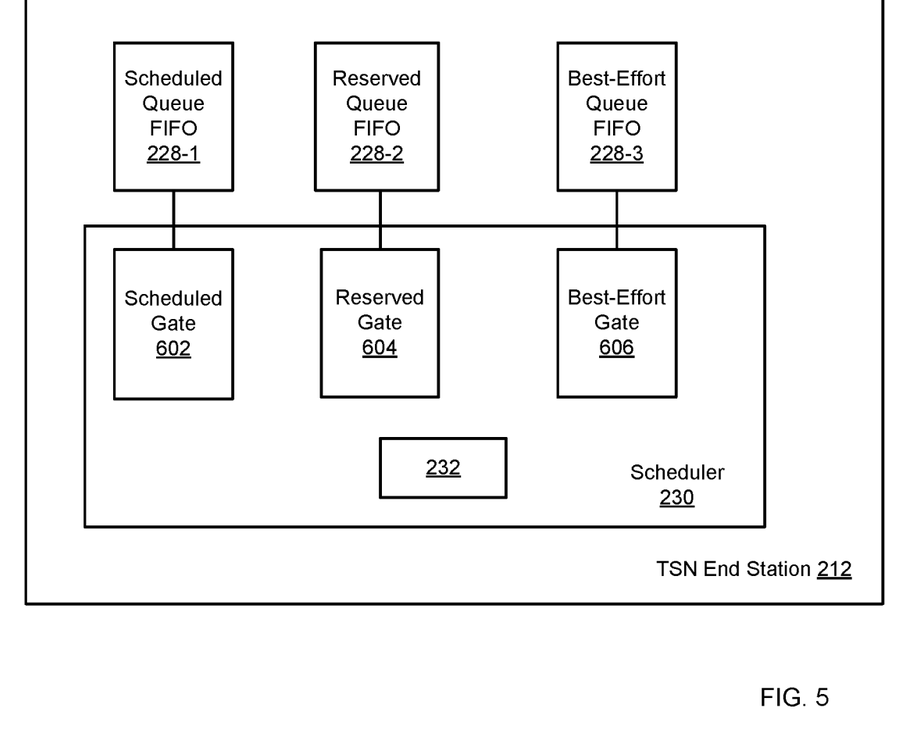
FIG. 5 is a block diagram illustrating an exemplary TSN end station circuit according to some embodiments of the present disclosure.

Referring to FIGS. 4A, 4B, 5, and 6, a TADMA method may be performed based on timing information associated with transmitting a stream to a network through an end station. As shown in the example of FIG. 4A, the timing information may include stream parameters, FIFO buffer occupancy information from the end station, scheduler cycle time from the end station, etc. As shown in the example of FIG. 4B, frames of streams may be retrieved from a memory based on the timing information.

In the examples of FIG. 4A, timing information (also referred to as stream cycle memory configurations) 402, 404, 406, and 408 of corresponding streams are illustrated. Timing information 402, 404, 406, and 408 may be stored in the timing information memory 320. Each of the timing information may include various stream parameters, including e.g., stream identifier (ID) 410, output queue type 412 (e.g., scheduled, reserved, best effort), fetch type 414 (e.g., discrete, continuous), number of frames in the stream 416, time slot 418, time stop parameter 420, any other suitable stream parameter, and/or a combination thereof. The stream ID 410 provides a locally unique identifier for a stream. In an example, the stream ID 410 may be derived based on stream reservation protocol (SRP) defined in IEEE 802.1Qcc. The output queue type 412 provides the types (e.g., scheduled, reserved, best effort) of queue associated with the stream. Frames of the stream are forwarded to the corresponding queue in the TSN end station 212. In an example, the output queue type 412 uses a corresponding SRP priority/rank attribute. The fetch type 414 may provide whether the data of the stream is fetched from the memory continuously or discretely. In an example, a stream with a scheduled priority has a continuous fetch type, and a stream with a reserved or best effort priority may have either a continuous fetch type or a discrete fetch type. The number of frames 416 may have a value of 1, 2, 3, or 4, and may provide the number of frames that a talker device produces per class measurement interval. The number of frames 416 may be derived from the SRP TSpec attribute MaxIntervalFrames, and may be not applicable for continuous fetches.

In some embodiments, the time slot 418 and time stop parameter 420 of the timing information are used to determine when a DMA transfer request is performed to fetch the stream from the memory. In some embodiments, the time slot 418 may be determined based on a particular scheduler and its properties (e.g., cycle time) of the TSN end station 212, a PTP offset, a software guard ban (SGB) to protect non-best-effort streams, any other suitable offset parameters, and/or a combination there. The PTP offset may be configured to compensate for variable latencies during the process of fetching the stream from memory and providing the fetched stream to the TSN end station 212. The time stop parameter 420 may provide whether the time slot 418 is applied to starting or stopping of the DMA transfer request. In an example, the time stop parameter 420 may be derived from SRP TSpec attribute, and may provide a value of "Start" for discrete fetches and "Stop" for continuous fetches.

As shown in the examples of FIGS. 4A and 4B, for each of streams A, B, C, and D, a method 450 is performed to retrieve frame(s) of the corresponding stream based on the corresponding timing information (e.g., one of the timing information 402, 404, 406, and 406). For example, timing information 402 and 404 provide timing information for streams A and B respectively with a scheduled priority. Timing information 402 provides that for a stream with a stream ID 410 of 2, the output queue type 412 is a scheduled queue for the scheduled priority, the fetch type 414 is a discrete fetch, the number of frames 416 is 1, the time slot 418 is "10 µs—PTP offset" from a scheduler cycle start time, and applies to a start operation (based on time stop parameter 420) to start performing TADMA retrieval of the scheduled stream A.

As shown in the example of FIG. 4B, a method 450 for retrieving frame(s) of the scheduled stream A may begin at block 452, where the timing control circuit 304 determines that timing information 402 for the scheduled stream A. The method 450 proceeds to block 454 and determines fetch start/stop time(s) based on the timing information 402. In the particular example, a fetch start time is determined based on time slot 418 ("10 µs—PTP offset") and time stop parameter 420 ("Start"), which indicates the time (e.g. "10 µs—PTP offset") from a scheduler cycle start time to start performing TADMA retrieval of a frame of the scheduled stream A. The method 450 proceeds to block 456, where a transfer control circuit 306 performs a TADMA retrieval to retrieve a frame of the schedule stream A at the fetch start time. The method 450 proceed to block 458, where a stream output controller 308 output the fetched frame to the end station 212.

Timing information 404 provides that for a stream with a stream ID 410 of 3, the output queue type 412 is a scheduled queue for the scheduled priority, the fetch type 414 is a discrete fetch, the number of frames 416 is 1, the time slot 418 is "20 µs—PTP offset," and the end of the time slot 418 (e.g., "20 µs—PTP offset") applies to a start operation to start performing TADMA retrieval of the scheduled stream B.

Timing information 406 and 408 provide timing information for reserved streams and best effort streams. Timing information 406 provides that for a stream with a stream ID 410 of 1, the output queue type 412 is a reserved queue for the reserved priority, the fetch type 414 is a continuous fetch, the time slot 418 is between "32 µs—PTP offset" and "9 ms—PTP offset," and the end of the time slot 418 (e.g., "9 ms—PTP offset" applies to a stop operation to stop performing TADMA retrieval of the reserved stream C. Timing information 408 provides that for a stream with a stream ID 410 of 0, the output queue type 412 is a best effort queue for the best effort priority, the fetch type 414 is a continuous fetch, the time slot 418 is between "9 ms—PTP offset" and "10 ms—PTP offset—SGB," and the end of the time slot 418 (e.g., "10 ms—PTP offset—SGB") applies to a stop operation to stop performing TADMA retrieval of the best effort stream D.

In various embodiments, the time slot 418 is determined based on a corresponding original time slot (e.g., 10 µs, 20 µs, 9 ms, and 10 ms) associated with the corresponding gates of the scheduler 230 of the end station 212 for the corresponding stream. Referring to the example of FIG. 5, in a TSN end station 212, communication gates 602, 604, and 606 receive traffic from the traffic queue FIFOs 228-1, 228-2, and 228-3 respectively. The communication gates 602, 604, and 606 are used for transmitting streams of scheduled, reserved, and best-effort traffics respectively, and may be referred to as scheduled gate 602, reserved gate 604, and best-effort gate 606.

Figure 6:
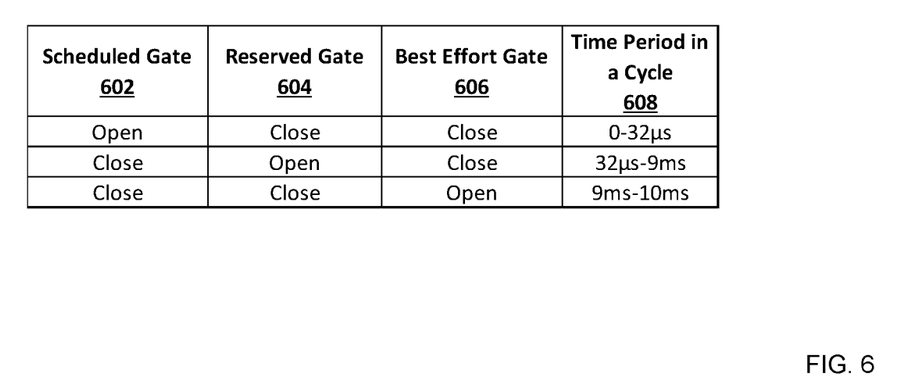
FIG. 6 is a table illustrating scheduler configurations according to some embodiments of the present disclosure.

Referring to the example of FIG. 6, two TSN streams with a scheduled priority need to be scheduled at particular time slots in a scheduler cycle (e.g., an IEEE 802.1Qbv scheduler cycle) starting at cycle_start, along with a reserved traffic (A/V) and a best effort stream in the scheduler of the TSN end station 212. In the particular example, the schedule cycle is 10 ms. TSN stream A needs to be scheduled at cycle_start+10 µs (with a frame size of 512 bytes) and TSN stream B needs to be scheduled at cycle_start+20 µs (with a frame size of 256 bytes). Assuming the Ethernet network link has a 1 Gbps speed, an Ethernet frame of 256 bytes frame takes about 2.1 µs over the Ethernet network link, and an Ethernet frame of 512 bytes takes about 4.2 µs over the Ethernet Link. As such, the scheduled gate 602 is programmed to close last least at or after a minimum scheduled gate open time (e.g., 22 µs). As shown in the example, the scheduled date 602 for the scheduled queue is programmed to close at cycle_start+32 µs. As such, an actual scheduled gate open time (also referred to as gate transmission time) of the scheduled fate 602 is of 32 µs, providing an extra 10 µs than the minimum scheduled gate open time of 22 µs. During the time between cycle-start and cycle-start+32 µs, the scheduled gate 602 is open to allow transmission, and the reserved gate 604 and best effort gate 606 are closed for transmission. It should be noted while three queues are used as an example in the description herein, the TADMA circuit may be implemented to have any number channels corresponding to a configured number of queues of the scheduler (e.g., all or part of eight priority queues defined in IEEE 802.1Qbv).

In the example of FIG. 6, about 90% of the link bandwidth is allocated to the reserved A/V traffic. As such, during the time between cycle-start+32 µs and cycle-start+9 ms, the reserved gate 604 is open and the scheduled gate 602 and best effort gate 606 are closed. The remaining time (between cycle-start+9 ms and cycle-start+10 ms) is allocated to best effort application, where the best effort gate 606 is open and the scheduled gate 602 and scheduled gate 604 are closed.

Referring to the example of FIG. 4A, as described below in detail in steps one, two, three, and four, using the timing information 402, 404, 406, and 408 of list 400 respectively, the TADMA circuit 208 may retrieve frames of the corresponding streams from the memory 210, such that the frames are available for the scheduler 230 of the TSN end station 212 at the required times. This will reduce/eliminate the stream-interference issues at the talker device 202.

As shown in steps one and two, two scheduled streams (scheduled streams A and B) have the same priority, and have allocated scheduled gate transmission times at 10 µs and 20 µs of the scheduled gate 602 respectively. At step one, the timing control 304 determines that timing information 402 is associated with the scheduled stream A (e.g., using the timing information memory 320), and determines a fetch time T1 for fetching a frame of the scheduled stream A. The transfer control 306 fetches from the memory 210 one frame for the scheduled stream A with a stream identifier having a value of two. The fetch time T1 is determined based on the time slot 418 (e.g., at 10 µs—PTP offset) such that the fetched frame is available for transmission at the scheduled gate 602 of scheduler 230 of the TSN end station 212 at 10 µs. For example, the fetch time T1 is configured to mask the system latency (i.e., including a PTP offset). The stream output control 308 may then push the retrieved frame to the scheduled queue FIFO 228-1 of the TSN end station 212.

At step two, after pushing the retrieved frame of the scheduled stream A at step one to the FIFOs 228 of the TSN end station 212, the timing control 304 waits until time T2 ("20 µs-PTP offset") is reached. During the interval between times T1 and T2, the TADMA controller 302 does not fetch any frame from the memory 210. At time T2, the transfer control 306 starts to fetch one frame for scheduled stream B with a stream ID of 3. The fetch time T2 is determined based on the time slot 418 (e.g., at 20 µs—PTP offset) such that the fetched frame is available for transmission at the scheduled gate 602 of scheduler 230 of the TSN end station 212 at 20 µs. The stream output control 308 may then push the retrieved frame to the scheduled queue FIFO 228-1 of the TSN end station 212. Note that at steps one and two, the timing information 402 and 404 have a discrete fetch type 414. As such, at steps one and two, the transfer control 306 may retrieve a single frame of the scheduled streams A and B respectively.

At step three, after pushing the retrieved frame of the scheduled stream B at step two to the scheduled queue FIFO 228-1 of the TSN end station 212, the timing control 304 moves to the next timing information 406 in the list for a reserved stream C. The timing information 406 provides a continuous fetch type 414 for the reserved stream C. As such, frames for the reserved stream C are to be fetched continuously (as per the frame availability in the memory 210) until T3 (9.0 ms—PTP offset), when the data transfer for the reserved stream C stops. At the scheduler 230 of the TSN end station 212, at cycle_start+9 ms, the reserved gate 604 for the reserved queue closes. Accordingly, the TADMA controller 302 parks at this entry of timing information 406 until cycle_start+9 ms—PTP offset, continuously checks the availability of new reserved frames retrieved from memory 210 (e.g., by reading a stream buffer pointer memory of the control storage 314), and pushes new reserved frames to the reserved queue FIFO 228-2 of the TSN end station 212.

At step four, after reaching the fetch stop time T3 of the timing information 406, the timing control 304 moves to the next timing information 408 in the list for a best-effort stream D. The timing information 408 provides a continuous fetch type 414 for the best-effort stream D, and the time stop parameter 420 indicates that the time slot 418 is for a stop time. As such, frames for the best effort stream D are to be fetched continuously (as per the frame availability in the memory 210) until T4 (10 ms—PTP offset—Soft Guard Band (SGB)). The SGB time may be used to protect non-best-effort traffic, such that the TADMA circuit 208 is idle before the next cycle start and is ready to fetch scheduled stream frames in the next cycle time. In other words, SGB makes sure that the TADMA circuit 208 is not performing best-effort frame fetches when the best-effort gate 606 closes. Steps one through four may then be repeated for every scheduler cycle (e.g., of 10 ms).

Figure 7:
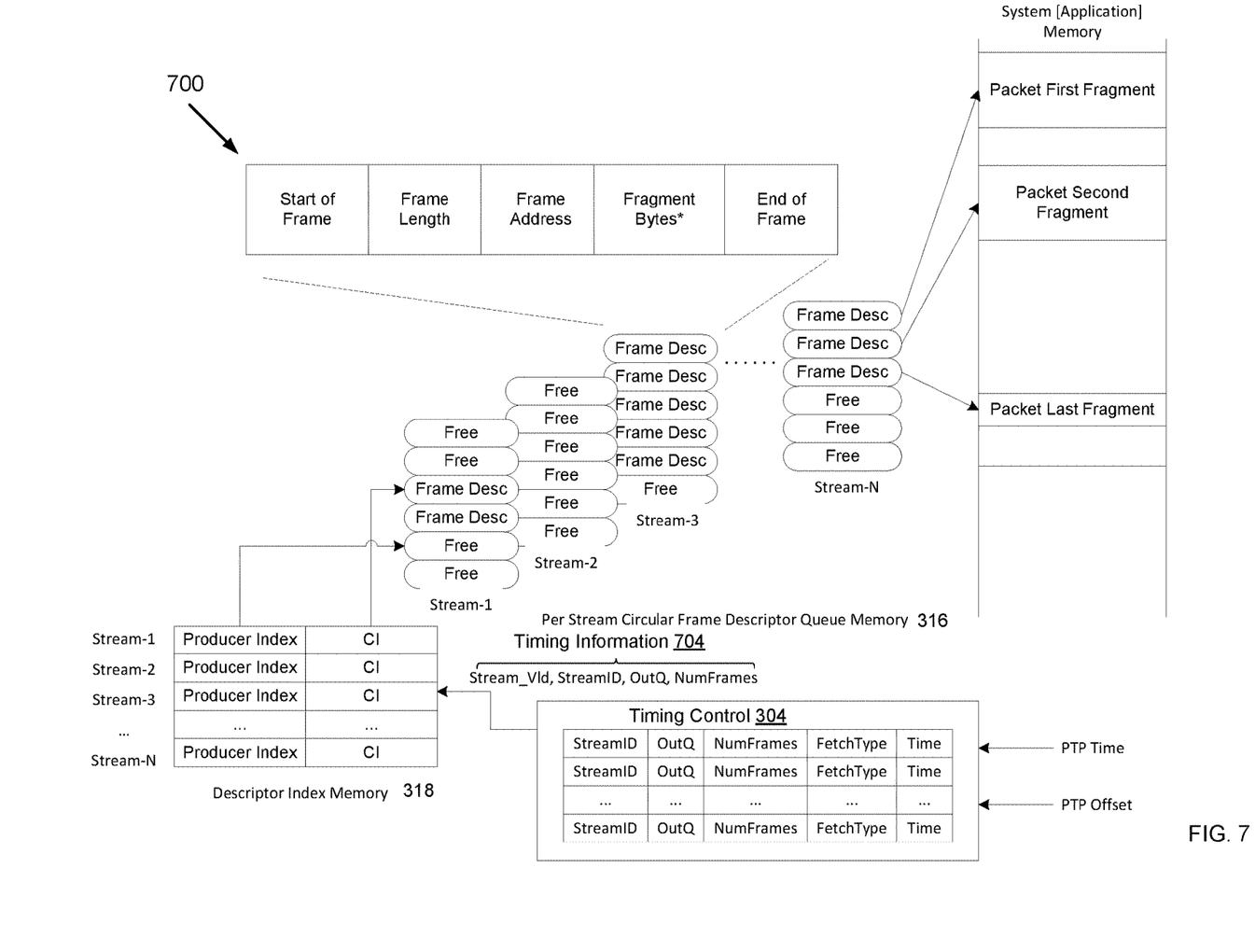
FIG. 7 is a block diagram illustrating a TADMA architecture using circular descriptor according to some embodiments of the present disclosure.

Referring to FIG. 7, illustrated is an example of TADMA structure 700 for a TADMA circuit 208 with per stream circular frame descriptors. The TADMA structure 700 includes a timing control circuit 304, which accurately predicts the stream and its associated parameters to be fetched in a time aware system, and maintains complete synchronization between time aware applications (e.g., TSN applications 216, 218) and the TSN end station 212. The timing control circuit 304 may provide timing information 704 associated with transmitting a stream to a network, including, for example, stream ID, fetch type, output queue, time slot, etc. By implementing the timing control circuit 304, the time aware applications do not need to be very accurate to place their data in the system memory 210, because each stream gets the entire schedule cycle time to be stored/fetched instead of just of the corresponding gate open time. In other words, application software associated with the streams only need to ensure that the stream is placed in the system memory 210 before its scheduled time slot for fetching. This significantly reduces the software load and allows for both scalability and accuracy of the TSN system.

As shown in FIG. 7, the TADMA structure 700 includes a per stream circular frame descriptor queue memory 316 for storing memory mapped frame descriptors. In some embodiments, application drivers make the frame data available in the system memory 210, and an application driver or a TADMA controller updates the frame descriptors in the memory mapped descriptors to provides system memory address and additional control information associated with the frame. The TADMA controller may read the frame descriptor, and fetches the frame from the system memory 210, and output the fetched stream to the TSN End Station 212. To improve performance, the TADMA may maintain a frame descriptor queue (e.g., implemented in the form of rings or link lists).

It is noted that TADMA functionalities can vary based on application requirements. For example, a circular descriptor ring may also be implemented as a link list. For further example, the number of fields in a frame descriptor may be adjusted to meet the specific application requirements.

Figure 8:
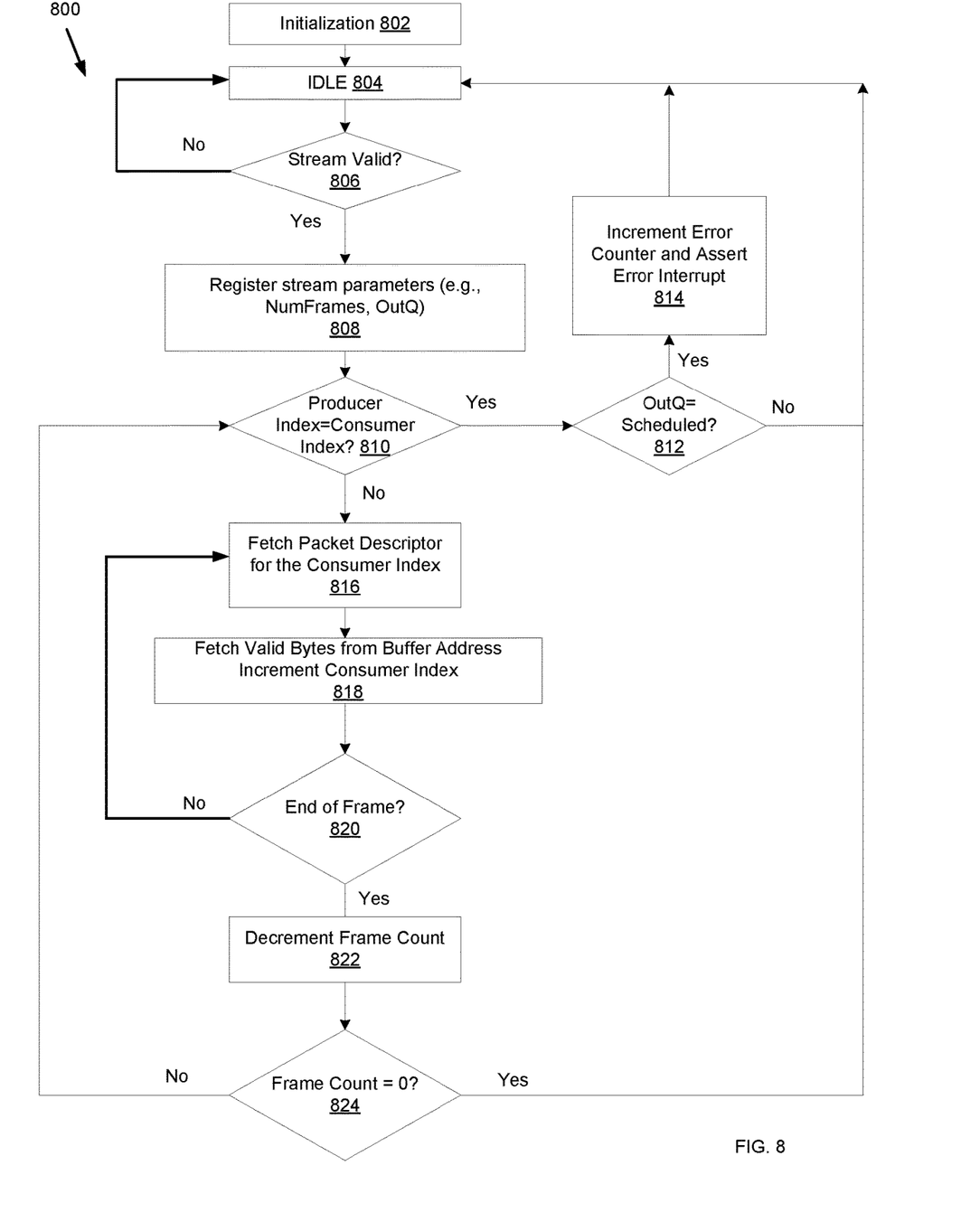
FIG. 8 is a flow chart illustrating a TADMA method according to some embodiments of the present disclosure.

Referring to FIG. 8, an example method 800 for providing time aware direct memory access using the TADMA structure 700 of the TADMA circuit 208 is illustrated. The method 800 enables fetching streams accurately from the memory based on their associated gate open times in the scheduler of the TSN end station, identifying streams which are not providing data during their corresponding gate open times and reporting them as error condition, and ensuring misbehaving high priority (e.g., scheduled) streams do not impact other well-behaved streams. The method 800 may use the per-stream statistics counters memory 321 of the control storage 314 to store various per-stream statistics counters, including e.g., producer index, consumer index, frame count, etc.

The method 800 begins at block 802, where an initialization process is performed. At block 802, various indexes (e.g., producer index and consumer index) for all streams are initialized. In an example, the producer index and consumer index for each stream are initialized to the start address of that corresponding stream's associated circular descriptor queue memory 316.

The method 800 may proceed to block 804, where the TADMA circuit 208 is idle. In some embodiments, during block 804, the application software may write frames to the memory 210. Also, the application software may provide stream parameters to TADMA driver software of the TADMA controller 302.

The method 800 may proceed to block 806, where the TADMA controller 302 determines whether a stream associated with the received stream parameters is valid.

In some embodiments, after it is determined that the stream is valid, the method 800 proceeds to block 808, where the stream parameters are registered. In an example, TADMA driver software of the TADMA controller 302 writes a frame descriptor at a memory address corresponding to a producer index (PI), and increments the PI. In examples where PI is less than a frame descriptor queue depth, PI is increased by one. In examples where PI is equal to the frame descriptor queue depth, PI is assigned to a start address of the frame descriptor queue.

In some embodiments, before writing a frame descriptor, the TADMA driver software may determine whether the frame descriptor queue is full. For example, the TADMA driver may determine that the queue is full if a difference between PI and CI is equal to the frame descriptor queue depth. If the TADMA driver determines that the frame descriptor queue is not full, it performs frame descriptor writes. If the frame descriptor queue is full, the TADMA driver waits for the TADMA hardware to fetch data and free the frame descriptor queue (e.g., by incrementing consumer index (CI)).

In some embodiments, the method 800 proceeds to block 810 and determines whether the PI equals CI. In some examples, the TADMA hardware checks whether PI is not the same as CI and identifies the availability of frames from the memory 210.

In some embodiments, at block 810, it is determined that PI is equal to CI and that the frame descriptor queue is empty. The method 800 may proceed to block 812 to determine whether the stream parameter indicates that the corresponding stream is a scheduled stream.

In some embodiments, at block 812 it is determined that the corresponding stream is a scheduled stream. The method 800 may then proceed to block 814 to generate an error notification (e.g., by incrementing an error counter and asserting an error interrupt). In an example, the TADMA hardware may detect an error condition, which may result in an interrupt function. In a particular example, the TADMA hardware detects an error condition after determining that there is no frame in the system memory 210 while the stream parameter (e.g., stream valid parameter) indicating that the stream is valid.

The method 800 may then proceed to block 804 where the TADMA circuit 208 is idle and waits for data to be written by the application drivers.

Alternatively, in some embodiments, at block 812 it is determined that the corresponding stream is not a scheduled stream. The method 800 may then proceed to block 804 where the TADMA circuit 208 is idle and waits for data to be written by the application drivers.

In some embodiments, at block 810, it is determined that PI is not equal to CI and that the frame descriptor queue is not empty, and as such, frames are available from the memory 210. The method 800 may then proceed to block 816, where a packet descriptor for the CI is fetched.

The method 800 may then proceed to block 818 to fetch valid bytes from a buffer address, and then increment CI. In some examples, a frame requires more than one descriptor. In those examples, the TADMA controller determines the availability of the required number of descriptors in the frame descriptor queue before performing writes to the descriptor memory. The TADMA driver may determine that the required number of descriptors are available after determining that PI−(CI+Number of Buffers) is less than the frame descriptor queue depth, and the required number of descriptors are not available otherwise.

The method 800 may proceed to block 820 to determine whether the end of frame has been reached. In some embodiments, after determining at block 820 that the end of frame has not been reached, the method 800 proceeds to block 816.

In alternative embodiments, after determining at block 820 at the end of frame has been reached, the method proceeds to block 822 to decrement the frame count. The method 800 may proceed to block 824 to determine whether the frame count is equal to 0. In some embodiments where the frame count is not equal to 0, the method 800 proceeds to block 810.

In some embodiments, where the frame count is equal to 0, the method 800 proceeds to block 804, where the TADMA circuit 208 waits for application drives to write data to the memory 210.

In various embodiments, the TADMA circuit 208 monitors the FIFOs 228 associated with each queue during entire operations. In some examples, priority flow control for TSN streams (scheduled streams) may be disabled (e.g., as provided by IEEE 802.1q), because flow control may interfere with schedules associated with these queues. In the absence of backpressure due to priority flow control, a FIFO full condition is generally not expected on these queues. However, a FIFO full condition may happen due to a link failure. For continuous queues (e.g., for reserved streams or best-effort streams), FIFOs may be full due to flow control, and as such backpressure gets applied by not fetching frames from the system memory 210. The TADMA circuit 208 may provide configuration control for each queue to drop frames fetched from the system memory 210 or apply backpressure on the system memory 210 by not fetching frames. For example, the TADMA circuit 208 may be configured to drop frames for discrete queues under a buffer full condition, thereby allowing latest data to be forwarded under cyclic schedules upon link/error recovery. For further example, the TADMA circuit 208 may be configured to apply backpressure to the system memory 210 by not fetching frames from the system memory 210 for continuous queues under a buffer full condition.

It is noted that in some embodiments (e.g., in an example as defined in IEEE 802.1Qbv specification), in a scheduler 230 of a TSN end station 212, more than one priority queue may a corresponding gate open for transmission at a same particular time slot. In those embodiments, the decision to select a priority queue of the scheduler may be based on data availability for a priority queue and arbitration mechanisms defined across these priority queues. In some examples, sharing a time slot across priority queues is not available for scheduled priority queues, because those scheduled priority queues need to maintain a very low tolerance for interference. When a plurality of priority queues share the same gate control list time slot, TADMA may be used for the scheduled priority queue, and other priority queues (e.g., reserved, best-effort) sharing gate control list time slots may be implemented using a mechanism in addition to TADMA.

In some embodiments, the TADMA circuit 208 includes status register and statistics counters that allows identification of error conditions detected during frame forwarding, and provides statistics of the number of frames sent on each channel of the TADMA circuit. The statistics counters may be used to manage or communicate statistics information and error conditions.

In some embodiment, the configuration interface to the TADMA circuit 208 may be generic, and supports various standards/protocols including e.g., IEEE 802.1Qcc Stream Reservation Protocol (SRP), Centralized User Configuration (CUC) mechanism defined by the AVNu Alliance, any other suitable protocols, and/or a combination thereof. For example, for scheduled and reserved channels, the TADMA circuit 208 may be configured based on IEEE 802.1Qcc or CUC defined control frame exchanges. For the best effort channel, the TADMA circuit 208 may be configured to allocate predefined channels for data and control frame exchanges.

In an alternative embodiment, the time-aware traffic queuing/control functions may be supported using a real-time operating system (RTOS). In that embodiment, the functions may fall completely in the software domain, where the operating system (OS) with real-time capability controls time sensitive traffic queues and schedule them as needed. Such an approach that is implemented completely in software domain may increase the processor load and/or lead to lower accuracy/predictability.

It is noted that various configurations illustrated in FIGS. 1-8 are exemplary only and not intended to be limiting beyond what is specifically recited in the claims that follow. It will be understood by those skilled in that art that other configurations may be used. One or more elements in the various embodiments may be implemented by software, hardware (e.g., an application specific integrated circuit (ASIC), application-specific standard parts (ASSPs), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage devices. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A circuit for memory access, comprising:
  a memory access control circuit coupled to a memory and configured to perform data transfers to retrieve data from the memory, the memory access control circuit includes:
    a timing control circuit configured to:
      determine first timing information based on a timing requirement for transmitting a first data stream to a first network,
        wherein the first timing information includes a stream fetch type selected from a continuous fetch type and a discrete fetch type based on a stream priority level of the first data stream; and
      determine a first fetch time for retrieving the first data stream from the memory based on the first timing information; and
    a transfer control circuit configured to:
      retrieve the first data stream from the memory based on the first fetch time.

2. The circuit of claim 1, wherein the first timing information includes a stream parameter selected from consisting of a stream identifier and a stream priority level.

3. The circuit of claim 1, wherein the memory access control circuit further comprises:
  an output control circuit configured to provide the first data stream to an end station coupled to the first network,
  wherein the first timing information includes end station timing information from the end station, and
  wherein the timing requirement includes a first timing requirement associated with transmitting the first data stream by the end station to the first network.

4. The circuit of claim 3, wherein the end station timing information includes:
  data buffer occupancy information associated with a plurality of data buffers of the end station configured to receive streams of corresponding stream priorities respectively.

5. The circuit of claim 4, wherein the end station timing information includes:
  scheduler information associated with a scheduler of the end station, and
  wherein the scheduler includes a plurality of data transmission gates configured to control data transmission from the plurality of data buffers to the first network, and
  wherein the first timing requirement is associated with transmitting the first data stream at a first data transmission gate.

6. The circuit of claim 5, wherein the scheduler information includes a scheduler cycle time of the scheduler or gate transmission times of the data transmission gates, and
  wherein the plurality of data transmission gates are configured to control data transmission based on the scheduler cycle time or gate transmission times.

7. The circuit of claim 6,
  wherein the timing control circuit is configured to:
    determine second timing information based on a second timing requirement for transmitting a second data stream to the first network; and
    determine a second fetch time for retrieving the second data stream from the memory based on the second timing information; and
  wherein the transfer control circuit is configured to:
    retrieve the second data stream from the memory based on the second fetch time.

8. The circuit of claim 7, wherein the first data stream and the second data stream have a same stream priority level,
  wherein the first timing requirement is associated with a first allocated gate transmission time associated with the first data transmission gate, and
  wherein the second timing requirement is associated with a second allocated gate transmission time associated with the first data transmission gate.

9. The circuit of claim 7, wherein the first data stream and the second data stream have different stream priority levels, and
  wherein the second timing requirement is associated with transmitting the second data stream at a second data transmission gate.

10. The circuit of claim 1, further comprising:
  a user input configured to receive a frame fetch latency of the timing information associated with fetching a frame from the memory;
  wherein the first fetch time is determined based on the frame fetch latency.

11. A method for memory access, comprising:
   determining a first timing information based on a timing requirement for transmitting a first data stream to a first network,
      wherein the first timing information includes a stream fetch type selected from a continuous fetch type and a discrete fetch type based on a stream priority level of the first data stream;
   determining a first fetch time for retrieving the first data stream from a memory based on the first timing information; and
   retrieving the first data stream from the memory based on the first fetch time.

12. The method of claim 11, wherein the first timing information includes a stream parameter selected from a stream identifier and a stream priority level.

13. The method of claim 12, wherein the stream priority level is selected from the group consisting of a scheduled priority level, a reserved priority level, and a best-effort priority level, and
   wherein the scheduled priority is higher than the reserved priority, and the reserved priority is higher than the best-effort priority.

14. The method of claim 13, wherein a continuous fetch type is determined for the scheduled priority level, and a discrete fetch type is determined for one of the reserved priority level and the best-effort priority level.

15. The method of claim 11, further comprising:
   providing, to an end station coupled to the first network, the retrieved first data stream;
   wherein the first timing information includes end station timing information from the end station.

16. The method of claim 15, wherein the end station timing information includes:
   data buffer occupancy information associated with a plurality of data buffers of the end station configured to receive streams of corresponding stream priorities respectively.

17. The method of claim 16, wherein the end station timing information includes:
   scheduler information associated with a scheduler of the end station,
      wherein the scheduler includes a plurality of data transmission gates configured to control data transmission from the plurality of data buffers to the first network;
   wherein the timing requirement is associated with transmitting the first data stream at a first data transmission gate.

18. The method of claim 17, wherein the scheduler information includes a scheduler cycle time of the scheduler or gate transmission times of the data transmission gates, and
   wherein the plurality of data transmission gates are configured to control data transmission based on the scheduler cycle time or gate transmission times.

19. The method of claim 11, further comprising:
   receiving, through a user input, a frame fetch latency of the timing information;
   wherein the first fetch time is determined based on the frame fetch latency.

20. The method of claim 11, wherein the first data stream is retrieved from the memory by performing a direct memory access (DMA) transfer.

* * * * *